(12) United States Patent
Inoue

(10) Patent No.: US 10,503,450 B2
(45) Date of Patent: Dec. 10, 2019

(54) JOB PROCESSING APPARATUS THAT STOPS JOB ACCORDING TO USER'S INSTRUCTION, METHOD OF CONTROLLING SAME, AND STORAGE MEDIUM

(71) Applicant: CANON KABUSHIKI KAISHA, Tokyo (JP)

(72) Inventor: Katsuhiro Inoue, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/160,183

(22) Filed: Oct. 15, 2018

(65) Prior Publication Data

US 2019/0121584 A1    Apr. 25, 2019

(30) Foreign Application Priority Data

Oct. 19, 2017   (JP) .................................. 2017-202697

(51) Int. Cl.
*G06F 3/12*      (2006.01)
*H04N 1/32*     (2006.01)

(52) U.S. Cl.
CPC ............ *G06F 3/126* (2013.01); *G06F 3/1204* (2013.01); *G06F 3/1258* (2013.01); *G06F 3/1284* (2013.01); *H04N 1/32* (2013.01)

(58) Field of Classification Search
CPC ............................... G06F 3/126; G06F 3/1204
See application file for complete search history.

(56) References Cited

U.S. PATENT DOCUMENTS

2006/0215208 A1*  9/2006 Takayama .......... H04N 1/00204
                                                                  358/1.14
2018/0091669 A1*  3/2018 Michimura ........ H04N 1/00411

FOREIGN PATENT DOCUMENTS

JP         2013256123 A      12/2013

* cited by examiner

*Primary Examiner* — Ibrahim Siddo
(74) *Attorney, Agent, or Firm* — Rossi, Kimms & McDowell LLP

(57) ABSTRACT

A job processing apparatus that is capable of positively stopping a transmission job desired by a user. A transmission job is input according to a user's operation. Uncompleted transmission jobs out of input transmission jobs are managed by a job management table. A first stop instruction for stopping a transmission job is received according to a user's operation. In a case where the first stop instruction is received during display of a configuration screen for making settings of a transmission job, a transmission job input last out of the transmission jobs managed by the job management table is searched for, and the searched-for transmission job is stopped.

6 Claims, 10 Drawing Sheets

TRANSMISSION CONFIGURATION SCREEN

USER AUTHENTICATION SCREEN

FIG. 3C

USER AUTHENTICATION ERROR SCREEN

User name or password is incorrect.

312

RETURN

FIG. 3D

USER DATABASE 313

| USER ID | USER NAME | PASSWORD |
|---------|----------------|------------|
| 0001 | Sato Taro | ********** |
| 0002 | Koike Norio | ********* |
| 0003 | Takahashi Yoji | *********** |
| 0004 | Maeda Sachiko | ********* |
| ⋮ | | |

FIG. 4A

| JOB ID | JOB RECEPTION TIME | JOB OWNER NAME | TRANSMISSION DESTINATION | TRANSMISSION DESTINATION NAME | STATUS | EXECUTION ORDER |
|---|---|---|---|---|---|---|
| 0001 | 9/17 12:30:12 | Sato Taro | 0123456789 | ○○ CORPORATION | BEING TRANSMITTED | 1 |

| JOB ID | JOB RECEPTION TIME | JOB OWNER NAME | TRANSMISSION DESTINATION | TRANSMISSION DESTINATION NAME | STATUS | EXECUTION ORDER |
|---|---|---|---|---|---|---|
| 0001 | 9/17 12:30:12 | Sato Taro | 0123456789 | ○○ CORPORATION | BEING TRANSMITTED | 1 |
| 0002 | 9/17 12:31:11 | Sato Taro | 0112223333 | △△ CORPORATION | BEING IN QUEUE | 2 |
| 0003 | 9/17 12:32:00 | Koike Norio | 0445556666 | ×× CORPORATION | BEING IN QUEUE | 3 |

TRANSMISSION JOB STATUS 512

| JOB ID | JOB RECEPTION TIME | TRANSMISSION DESTINATION | TRANSMISSION DESTINATION NAME | STATUS |
|---|---|---|---|---|
| 0001 | 9/17 12:30:12 | 0123456789 | ○○ CORPORATION | BEING TRANSMITTED |
| 0002 | 9/17 12:31:11 | 0112223333 | △△ CORPORATION | BEING IN QUEUE |
| 0003 | 9/17 12:32:00 | 0445556666 | ×× CORPORATION | BEING IN QUEUE |
|  |  |  |  |  |
|  |  |  |  |  |
|  |  |  |  |  |

513

STOP 514

CLOSE 515

JOB PROCESSING APPARATUS THAT STOPS JOB ACCORDING TO USER'S INSTRUCTION, METHOD OF CONTROLLING SAME, AND STORAGE MEDIUM

BACKGROUND OF THE INVENTION

Field of the Invention

The present invention relates to a job processing apparatus, a method of controlling the same, and a storage medium, and more particularly to a job processing apparatus that stops a job according to a user's instruction, a method of controlling the same, and a storage medium.

Description of the Related Art

Conventionally, in a case where a user stops a job on a job processing apparatus, such as an MFP, the user is required to perform a predetermined operation on a console section of the job processing apparatus. More specifically, the user is required to press a stop key on the console section of the job processing apparatus, select a job desired to be stopped from a job list displayed by pressing the stop key, and provide an instruction for stopping the selected job (see Japanese Laid-Open Patent Publication (Kokai) No. 2013-256123).

However, in using the method described in Japanese Laid-Open Patent Publication (Kokai) No. 2013-256123, even in a case where the user notices an input error of the destination immediately after inputting a job for facsimile transmission, and desires to stop the facsimile transmission of the input job, it takes time to search the job list for the job desired to be stopped. Therefore, facsimile transmission of the job desired to be stopped may be performed while the user is searching for the desired job, so that it is sometimes impossible to stop the facsimile transmission.

SUMMARY OF THE INVENTION

The present invention provides a job processing apparatus that is capable of positively stopping a transmission job desired by a user, a method of controlling the same, and a storage medium.

In a first aspect of the present invention, there is provided a job processing apparatus comprising an input unit configured to input a transmission job according to a user's operation, a management unit configured to manage transmission jobs which are uncompleted out of transmission jobs input by the input unit, a reception unit configured to receive a first stop instruction for a transmission job according to a user's operation, a search unit configured to search for a transmission job input last out of the transmission jobs managed by the management unit, in a case where the first stop instruction is received during display of a configuration screen for making settings of a transmission job, and a stopping unit configured to stop the last input transmission job searched-for by the search unit.

In a second aspect of the present invention, there is provided a method of controlling a job processing apparatus, comprising inputting a transmission job according to a user's operation, managing uncompleted transmission jobs out of transmission jobs input by said inputting, receiving a first stop instruction for a transmission job according to a user's operation, searching for a transmission job input last out of the managed transmission jobs, in a case where the first stop instruction is received during display of a configuration screen for making settings of a transmission job, and stopping the searched-for last input transmission job.

In a third aspect of the present invention, there is provided a non-transitory computer-readable storage medium storing a computer-executable program for executing a method of controlling a job processing apparatus, wherein the method comprises inputting a transmission job according to a user's operation, managing uncompleted transmission jobs out of transmission jobs input by said inputting, receiving a first stop instruction for a transmission job according to a user's operation, searching for a transmission job input last out of the managed transmission jobs, in a case where the first stop instruction is received during display of a configuration screen for making settings of a transmission job, and stopping the searched-for last input transmission job.

According to the present invention, it is possible to positively stop a transmission job desired by a user.

Further features of the present invention will become apparent from the following description of exemplary embodiments (with reference to the attached drawings).

BRIEF DESCRIPTION OF THE DRAWINGS

FIGS. 3A to 3D are diagrams showing screens displayed on an LCD of the console section shown in FIG. 2.

FIGS. 4A and 4B are diagrams each showing a job management table managed in an HDD appearing in FIG. 1.

FIGS. 5A to 5C are diagrams showing stop confirmation screens displayed on the LCD in a case where a stop key on the console section is pressed by a user.

DESCRIPTION OF THE EMBODIMENTS

The present invention will now be described in detail below with reference to the accompanying drawings showing embodiments thereof. However, the drawings described in this embodiment are given by way of example, and the scope of the present invention is not limited to those.

Figure 1:
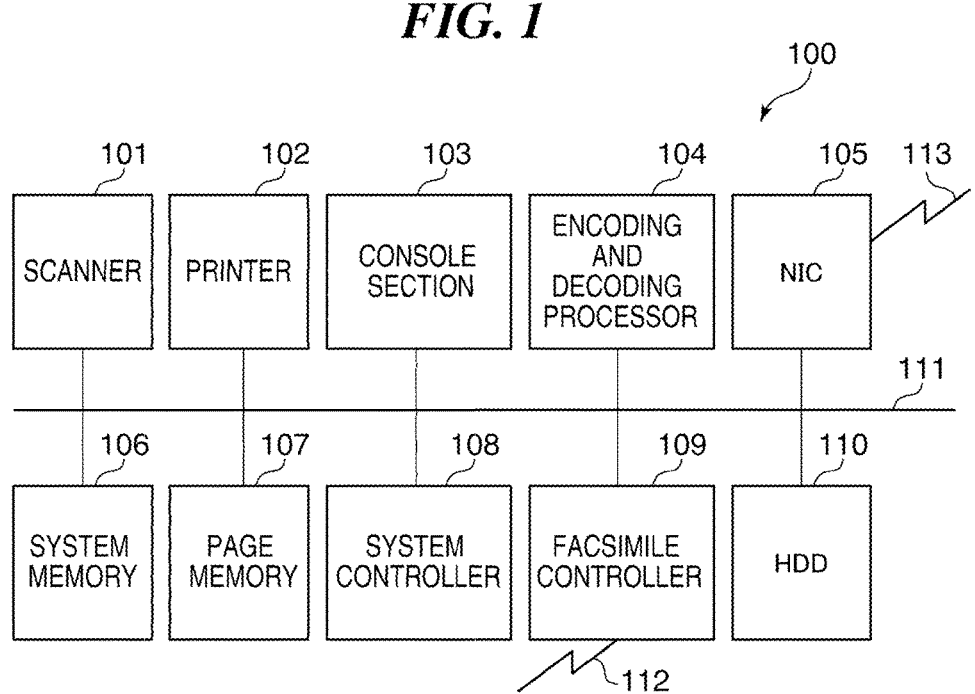
FIG. 1 is a block diagram of a job processing apparatus according to an embodiment of the present invention.

FIG. 1 is a block diagram of a job processing apparatus 100 according to an embodiment of the present invention. The job processing apparatus 100 according to the present invention is a multi-function apparatus equipped with a transmission function for transmitting an image read from an original to an external apparatus, and a copy function for printing an image read from an original.

A scanner 101 is a reading device that scans an original in a designated mode (a mode defined by a paper size, a resolution, a density, and so forth).

A printer 102 is a printing apparatus that prints document data or the like, and delivers printed matter to a sheet discharge tray via a sheet discharger, such as a finisher.

A console section 103 includes numeric keys, a start key, a stop key, and other various setting keys, and is used for receiving various operations performed by a user. Further, the console section 103 includes a touch screen (such as a touch-panel type liquid crystal display (hereinafter referred to as the LCD)), and when performing various setting operations, the user can select each item displayed within a screen by touching the screen. Further, the LCD displays the operating state of the apparatus, which is to be notified to the user. The console section 103 will be described in detail hereinafter with reference to FIG. 2.

An encoding and decoding processor 104 encodes and compresses image information to be transmitted, and decodes and decompresses received compressed data to thereby restore the data to original image information.

An NIC (Network Interface Card) 105 inputs and outputs information from and to a device installed under another network environment via a LAN 113. For example, the NIC 105 is capable of performing mail transmission, SMB (Server Message Block) transmission, FTP (File Transfer Protocol) transmission, and so forth, using a network.

A system memory 106 is formed by an SRAM and a ROM, and stores information to be registered in the job processing apparatus 100 in advance, such as user mode information, in the SRAM, and a control program of the job processing apparatus 100 and other programs in the ROM.

A page memory 107 stores image information for one page, when data is encoded and decoded by the encoding and decoding processor 104.

A system controller 108 includes a CPU, and monitors and controls the various components of the job processing apparatus 100 shown in FIG. 1.

A facsimile controller 109 is connected to a telephone line, such as a PSTN 112, and controls communication with another facsimile machine via this telephone line.

An HDD (hard disk drive) 110 is a storage device incorporating a nonvolatile storage medium, and is used for storing scanned documents and the like, and storing jobs (including settings) for processing image data. Note that the HDD 110 is capable of storing a plurality of such jobs. Jobs stored in the HDD 110 are sequentially executed by the system controller 108. Thus, the HDD 110 functions as a holding section for holding jobs to be executed until the jobs are executed.

The components of the job processing apparatus 100 shown in FIG. 1 are interconnected via a system bus 111.

Figure 2:
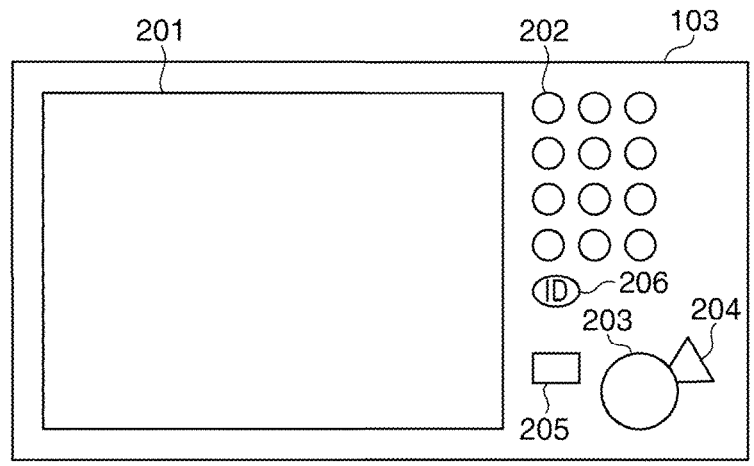
FIG. 2 is a diagram of a console section appearing in FIG. 1.

Next, the console section 103 appearing in FIG. 1 will be described with reference to FIG. 2.

The console section 103 is comprised of the LCD, the numeric keys, the start key, and the stop key (reception unit), which are denoted by reference numerals 201, 202, 203, and 204, respectively, and a reset key 205 and an ID key 206.

The LCD 201 displays various screens based on instructions from the system controller 108.

The numeric keys 202 are hard keys for receiving an input of a telephone number as a facsimile transmission destination, and receiving an input of the number of copies to be printed from the user.

The start key 203 is a hard key for inputting various jobs, such as a copy job, a print job, and a transmission job, when the user presses the start key 203.

The stop key 204 is a hard key for receiving an instruction for stopping a job being executed or being in queue, from the user.

The reset key 205 is a hard key for clearing a value of a setting being configured and restoring the setting to an initial value.

The ID key 206 is a hard key for receiving a request for logging into the job processing apparatus 100 in a case where user authentication is set. Further, in a case where the ID key 206 is pressed in a transmission job-stopping process, described hereinafter, the logged-in user is logged out.

Next, the screens displayed on the LCD 201 of the console section 103 shown in FIG. 2, such as a transmission configuration screen and a user authentication screen, will be described with reference to FIGS. 3A to 3D.

First, a description will be given of the screen shown in FIG. 3A, on which the user makes settings for scanning an original and transmitting the scanned data by E mail or facsimile (hereinafter referred to as the "transmission configuration screen"). This transmission configuration screen is displayed, for example, when the console section 103 detects that the user has pressed an icon for using the transmission function, included in a menu screen displayed on the LCD 201. This menu screen includes not only the icon for using the transmission function, but also an icon for using the copy function. Of course, icons for using other functions may be included.

The user can designate a transmission destination by selecting one of the three icons of address book 301, one touch 302, and new destination 303, on the transmission configuration screen.

In a case where the user selects the icon of address book 301, the screen is changed to a screen displaying a list of destinations registered in the address book by the user in advance, and the user can designate a transmission destination from the displayed list.

In a case where the user selects the icon of one touch 302, the screen is changed to a screen displaying a list of destinations registered in the icon of one touch 302 by the user in advance, and the user can designate a transmission destination from the displayed list.

In a case where the user selects the icon of new destination 303, the screen is changed to a screen displaying a list of functions for which a new destination can be designated, such as facsimile transmission, mail transmission, SMB transmission, and FTP transmission. In a case where the user designates e.g. the facsimile transmission function from the displayed list, the screen is changed to a screen on which a telephone number can be entered by using the numeric keys 202. By entering a telephone number on this screen using the numeric keys 202, the user can designate the telephone number which is a new destination of facsimile transmission.

Figure 3A:
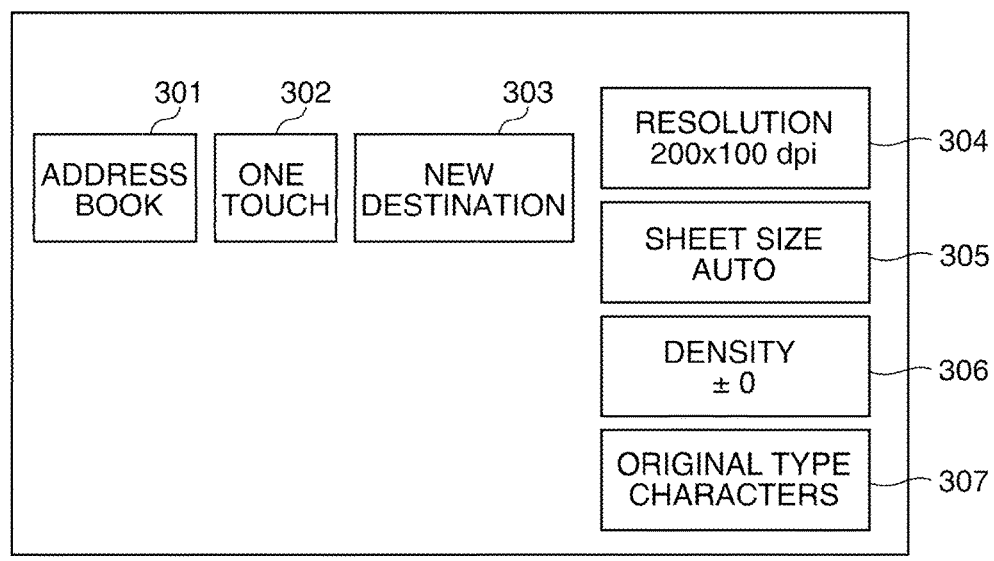

Further, by selecting one of the four icons of resolution 304, sheet size 305, density 306, and original type 307, appearing in FIG. 3A, the user can make a setting for reading an original. On these four icons, the current setting values are also displayed, respectively, and when the user selects an icon of which the setting the user desires to change, the screen is changed to a screen displaying a list of a plurality of setting values to which the setting can be changed. By selecting one setting value from the displayed list, the user can provide an instruction for changing the setting to a desired value.

When an instruction for changing the setting is received via the console section 103, the system controller 108 updates the current setting value displayed on one of the four icons on the LCD 201 according to the change instruction.

When the start key 203 is pressed in a state in which the setting values have been updated, the system controller 108 inputs a transmission job. More specifically, first, the system controller 108 causes the scanner 101 to read an image on an original based on the above-described updated setting values, and stores read image data in the HDD 110. Then, the system controller 108 generates a transmission job by associating the setting values with the image data stored in the HDD 110. After the start key 203 has been pressed, the display screen is returned to the transmission configuration screen on which the default values are set as the setting values of the transmission settings.

Further, the system controller 108 registers the information on the transmission job thus generated in a job management table managed in the HDD 110. This job management table will be described hereinafter with reference to FIG. 4.

After that, the system controller 108 manages the execution status of each of transmission jobs and the execution order of the transmission jobs according to the information on the transmission jobs, registered in the job management table.

Figure 3B:
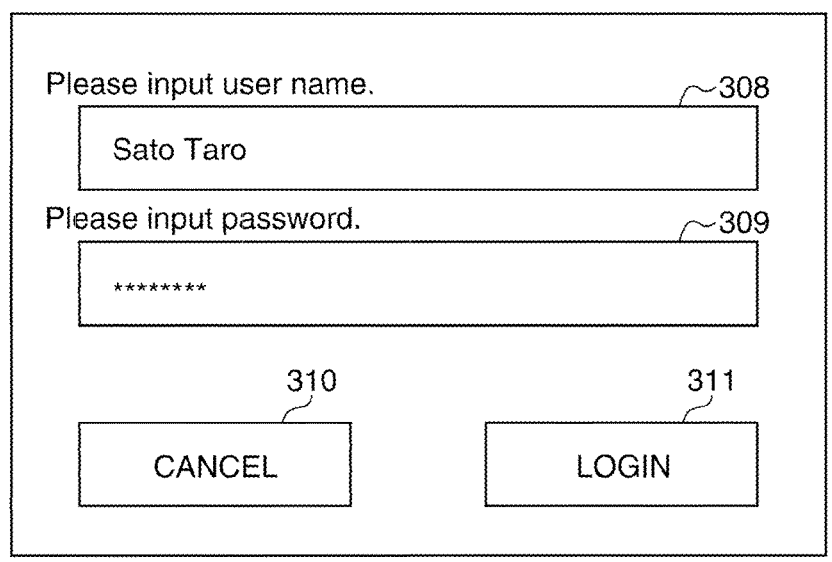

FIG. 3B shows the user authentication screen for performing user authentication in the job processing apparatus 100.

Reference numerals 308 309, 310, and 311 denote a user name input box, a password input box, a cancel button, and a login button, respectively. When the user enters a user name and a password in the user name input box 308 and the password input box 309, respectively, and presses the login button 311, user authentication can be performed. In the present embodiment, user authentication can also be performed by pressing the ID key 206 in place of the login button 311.

Note that although in the present embodiment, user authentication requires entering of a user name and a password on the user authentication screen, the present invention is not limited to this, insofar as user authentication is performed using information at least including a user name.

FIG. 3C shows a user authentication error screen displayed on the LCD 201 of the console section 103. Reference numeral 312 denotes a return button. In a case where the user enters a wrong user name or a wrong password, and presses the login button 311 on the user authentication screen shown in FIG. 3B, this user authentication error screen is displayed. The user can return the screen to the user authentication screen shown in FIG. 3B by pressing the return button 312.

FIG. 3D shows a user database 313 stored in the HDD 110.

The user database 313 is a database comprised of user IDs, user names, and passwords, and is stored in the HDD 110. Note that each password is stored in an encrypted state.

Next, the job management table managed in the HDD 110 will be described with reference to FIGS. 4A and 4B.

The information stored in the job management table, shown in FIGS. 4A and 4B, is updated by the system controller 108 in any of a case where a transmission job is generated by the system controller 108, a case where execution of a transmission job is completed, and a case where a transmission job is stopped. In other words, only transmission jobs which have not been transmitted, i.e. only transmission jobs being executed or being in queue are managed by the job management table.

First, the system controller 108 registers information on a transmission job input by pressing the start key 203 in the job management table as shown in FIG. 4A.

This job management table manages the parameters of a job ID 401, a job reception time 402, a job owner name 403, a transmission destination 404, a transmission destination name 405, a status 406, and an execution order 407, for each transmission job.

The transmission jobs registered in the job management table are executed by the system controller 108 according to the execution order 407.

More specifically, the transmission jobs are executed in an increasing order of values of the execution order 407, and when execution of a transmission job is completed, the system controller 108 deletes the transmission job the execution of which is completed from the job management table, and reduces each of the values of the execution order 407 of the other transmission jobs, by one.

The value of the job ID 401 indicates a code for uniquely identifying a transmission job, which is assigned by the system controller 108 when a transmission job is generated.

The value of the job reception time 402 indicates a time at which a transmission job is received, more specifically, a time at which a transmission job input by pressing the start key 203 is registered in the job management table.

The value of the job owner name 403 indicates, in a case where a transmission job is registered in the job management table in a state in which user authentication has been performed, an authenticated user name On the other hand, in a case where a transmission job is registered in the job management table in a state in which user authentication has not been performed, nothing is set in the job management table as the value of the job owner name 403 of the transmission job.

For example, in a case where a transmission job is registered in the job management table after user authentication has been performed using a user name of "Sato Taro" on the user authentication screen shown in FIG. 3B, "Sato Taro" is set as the value of the job owner name 403 of the registered transmission job.

The value of the transmission destination 404 indicates, if the job is a transmission job for performing facsimile transmission, a telephone number which is designated as the transmission destination by the user on the transmission configuration screen shown in FIG. 3A. In a case where the job is a transmission job for performing E-mail transmission, the value of the transmission destination 404 indicates an E-mail address.

As the value of the transmission destination name 405, a transmission destination name registered in advance is set only in a case where the transmission destination is designated by selecting one of the icons of address book 301 and one touch 302 on the transmission configuration screen shown in FIG. 3A. In a case where the transmission destination is designated by selecting the icon of new destination 303, nothing is set as the value of this parameter.

The value of the status 406 indicates the status of execution of each transmission job. Examples of the status include "being transmitted", "being in queue", "being stopped", and so forth, which are controlled by the system controller 108.

FIG. 4A shows the job management table in which one transmission job having the job ID "0001" is registered, and its status indicates "being transmitted". This indicates that after causing the scanner 101 to read image data from an original and perform image processing on the read image data, the system controller 108 is executing facsimile transmission processing using the facsimile controller 109.

FIG. 4B shows the job management table updated from the state shown in FIG. 4A when the system controller 108 has further received other transmission jobs and stored the transmission jobs in the HDD 110 as the transmission jobs to be executed.

The job management table shown in FIG. 4B has three transmission jobs. The transmission job having the job ID "0001" is being executed by the system controller 108, and the status of this transmission job indicates "being transmitted". Further, the statuses of the other transmission jobs indicate "being in queue". This indicates that each transmission job managed by the job management table other than the transmission job having the job ID "0001" is held in the HDD 110, and has not been executed by the system controller 108 yet.

Next, a description will be given, with reference to FIGS. 5A to 5C, of a stop confirmation screen displayed on the LCD 201 for receiving a user's instruction indicating whether or not to actually stop a transmission job to be stopped, in a case where the stop key 204 is pressed by the user.

In the case where the stop key 204 is pressed by the user, the system controller 108 determines the number of transmission jobs to be executed, which are held in the HDD 110, based on the job management table described with reference to FIGS. 4A and 4B. The system controller 108 switches between screens to be displayed on the LCD 201 as the stop confirmation screen, according to the determined number of transmission jobs.

Figure 5A:
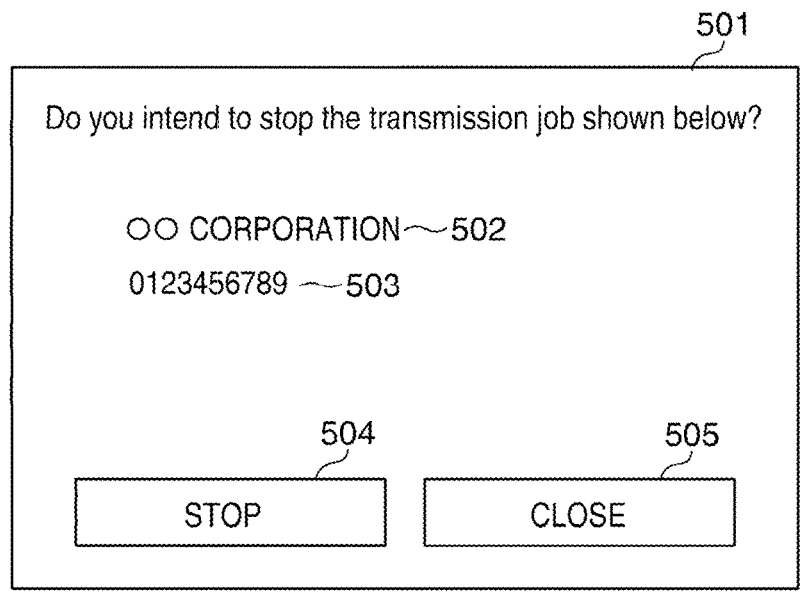
Figure 5B:
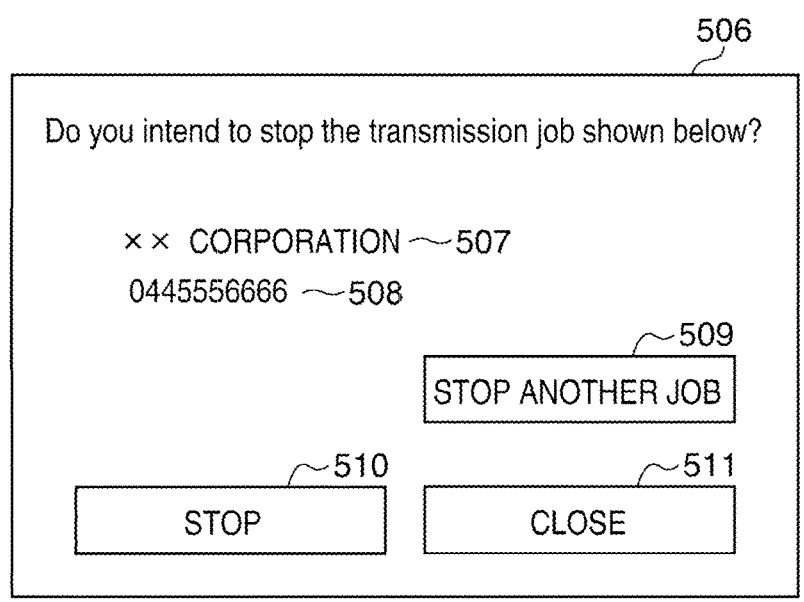

If it is determined that the number of held transmission jobs is one, the system controller 108 displays a stop confirmation screen 501 shown in FIG. 5A on the LCD 201. On the other hand, if it is determined that the number of held transmission jobs is more than one, the system controller 108 displays a stop confirmation screen 506 shown in FIG. 5B on the LCD 201.

First, a description will be given of the case where when the stop key 204 is pressed by the user, the number of transmission jobs registered in the job management table is determined to be one, with reference to the job management table shown in FIG. 4A and the stop confirmation screen 501.

On the stop confirmation screen 501, the transmission job having the job ID "0001" in FIG. 4A is a job to be stopped. Therefore, "○○ Corporation" which is the transmission destination name of this transmission job is displayed in a transmission destination name display area 502, and "0123456789" which is the transmission destination (such as a telephone number or an E-mail address) of this transmission job is displayed in a transmission destination display area 503. Further, a stop button 504 and a close button 505 are displayed as items for selection. When the user desires to stop the transmission job displayed on the stop confirmation screen 501, the user presses the stop button 504. On the other hand, when the user does not desire to stop the transmission job displayed on the stop confirmation screen 501, the user presses the close button 505.

In a case where the stop button 504 is pressed, the system controller 108 stops the transmission job displayed on the stop confirmation screen 501, and deletes information on this transmission job from the job management table. In the case of the illustrated example, information on the transmission job having the job ID "0001" in the job management table shown in FIG. 4A and held in the HDD 110 is deleted.

Further, in a case where the close button 505 is pressed, the system controller 108 closes the stop confirmation screen 501 without stopping the transmission job held in the HDD 110.

Next, a description will be given of the case where when the stop key 204 is pressed by the user, the number of transmission jobs registered in the job management table is determined to be more than one, with reference to the job management table shown in FIG. 4B and the stop confirmation screen 506.

On the stop confirmation screen 506, the transmission destination name of a transmission job to be stopped, extracted from the job management table, is displayed in a transmission destination name display area 507, and the transmission destination of the transmission job to be stopped is displayed in a transmission destination display area 508.

The transmission job to be stopped, extracted here, is a transmission job which is the latest in job reception time in the job management table, and a transmission job having the job ID "0003" in the job management table shown in FIG. 4B corresponds to the extracted transmission job.

Therefore, "xx Corporation" is displayed in the transmission destination name display area 507, and "0445556666" is displayed in the transmission destination display area 508.

Further, a "stop another job" button 509, a stop button 510, and a close button 511 are displayed as items for selection on the stop confirmation screen 506.

In a case where the user desires to stop a transmission job managed by the job management table other than the transmission job displayed on the stop confirmation screen 506, the user presses the "stop another job" button 509. When the "stop another job" button 509 is pressed, the system controller 108 displays a transmission job status screen 512 shown in FIG. 5C on the LCD 201.

On the other hand, in a case where the user desires to stop the transmission job displayed on the stop confirmation screen 506, the user presses the stop button 510. When the stop button 510 is pressed, the system controller 108 stops the transmission job displayed on the stop confirmation screen 506, and deletes information on this transmission job from the job management table. In the case of the illustrated example, information on the transmission job having the job ID "0003" in the job management table shown in FIG. 4B and held in the HDD 110 is deleted.

Further, in a case where the close button 511 is pressed, the system controller 108 closes the stop confirmation screen 506 without stopping the transmission job held in the HDD 110.

The transmission job status screen 512 shown in FIG. 5C is comprised of a transmission job list 513, a stop button 514, and a close button 515, and is displayed on the LCD 201 of the console section 103.

On the transmission job list 513, the latest transmission status of each transmission job acquired from the job management table is displayed. By touching a point on the transmission job list 513, where information on a desired transmission job is described, the user can select the transmission job. In a case where the stop button 514 is pressed in a state in which one of the transmission jobs has been selected from the transmission job list 513, the system controller 108 sets the selected transmission job as the transmission job to be stopped. Then, the system controller 108 displays the stop confirmation screen 501 showing the transmission destination name and the transmission destination of the transmission job to be stopped in the transmission destination name display area 502 and the transmission destination display area 503, respectively. If the stop button 504 is pressed in this state, the system controller 108 stops the selected transmission job, and deletes information on the stopped transmission job from the job management table. Further, in a case where the close button 515 is pressed, the system controller 108 closes the transmission job status screen 512 without stopping any transmission job held in the HDD 110.

Note that when the stop button 514 is pressed, the system controller 108 may be configured to stop the selected transmission job and delete information on the stopped transmission job from the job management table without displaying the stop confirmation screen 501.

Next, the transmission job-stopping process performed when the stop key 204 is pressed by the user in a case where user authentication has not been performed will be described with reference to FIGS. 6A and 6B. The present process is performed by the system controller 108 that loads a program for executing the present process, which is stored in the ROM of the system memory 106, into a RAM, not shown.

Note that the transmission job-stopping process performed when the stop key 204 is pressed by the user in a case where user authentication has been performed will be described hereinafter with reference to FIGS. 7A and 7B.

Figure 6A:
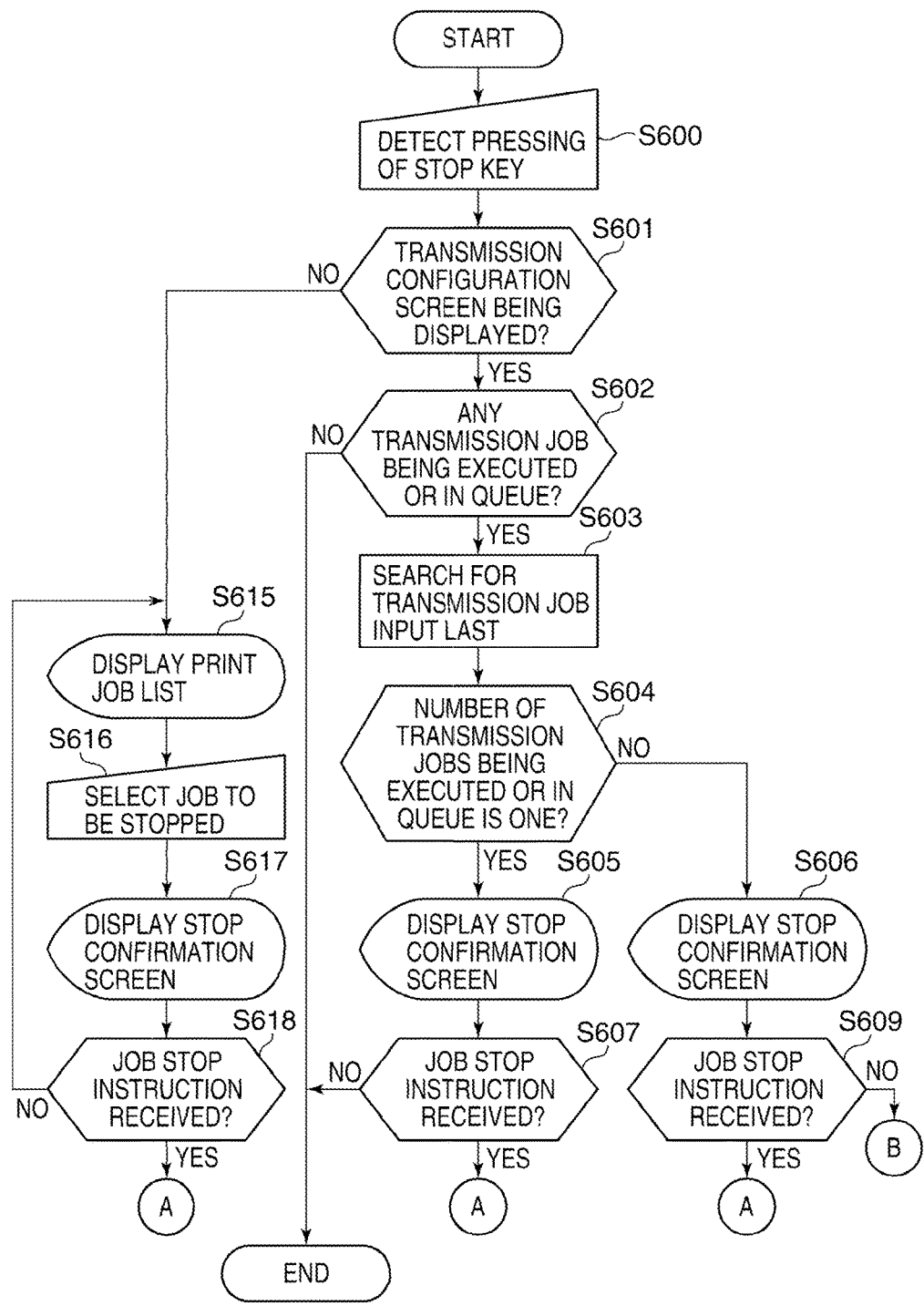
FIG. 6A is a flowchart of a transmission job-stopping process performed when the stop key is pressed by the user in a case where user authentication has not been performed.

Referring to FIG. 6A, first, upon detecting in a step S600 that the stop key 204 has been pressed, the system controller 108 proceeds to a step S601. Here, as a situation in which the stop key 204 is pressed, a situation can be assumed in which immediately after a transmission job has been input, the user desires to stop execution of the input transmission job, and immediately presses the stop key 204. Therefore, the process described hereafter is based on the following assumption: Since the screen displayed immediately after the input of a transmission job is the transmission configuration screen described above with reference to FIG. 3A, if the stop key 204 is pressed during display of the transmission configuration screen, it would be an instruction for stopping the input transmission job (the last input transmission job). Further, if the stop key 204 is pressed during display of a screen other than the transmission configuration screen (such as the menu screen), it would be an instruction for stopping some kind of job, such as a transmission job or a print job.

In the step S601, the system controller 108 determines whether or not the transmission configuration screen is being displayed on the LCD 201 of the console section 103, and if the transmission configuration screen is being displayed, the system controller 108 determines that the instruction for stopping the transmission job has been received, and proceeds to a step S602. On the other hand, if the transmission configuration screen is not being displayed (for example, if the menu screen is being displayed), the system controller 108 determines that the instruction for stopping some kind of job, such as a transmission job or a print job, has been received, and proceeds to a step S615.

In the step S602, the system controller 108 determines, based on the job management table (see e.g. FIG. 4A or 4B), whether or not there is a transmission job held in the HDD 110, i.e. there is a transmission job being executed or being in queue. If it is determined that there is a transmission job being executed or being in queue, the system controller 108 proceeds to a step S603, whereas if not, the present process is terminated.

In the step S603, the system controller 108 (search unit) searches the job management table for a transmission job which was input last, i.e. a transmission job which is the latest in the job reception time 402. After that, the system controller 108 holds the transmission destination name and the transmission destination of the transmission job retrieved by search as a search result, and proceeds to a step S604.

In the step S604, the system controller 108 determines based on the job management table whether the number of transmission jobs held in the HDD 110 is one or more than one.

If it is determined that the number of transmission jobs is one, the system controller 108 proceeds to a step S605, whereas if it is determined that the number of transmission jobs is more than one, the system controller 108 proceeds to a step S606.

In the step S605, the system controller 108 displays the stop confirmation screen 501 showing the transmission destination name and the transmission destination, which are held in the step S603 as the search result, in the transmission destination name display area 502 and the transmission destination display area 503, respectively, on the LCD 201. Then, the system controller 108 proceeds to a step S607.

In the step S607, the system controller 108 determines whether or not an instruction for stopping the transmission job held in the HDD 110 has been received. More specifically, the system controller 108 determines whether or not the stop button 504 on the stop confirmation screen 501 has been pressed.

Figure 6B:
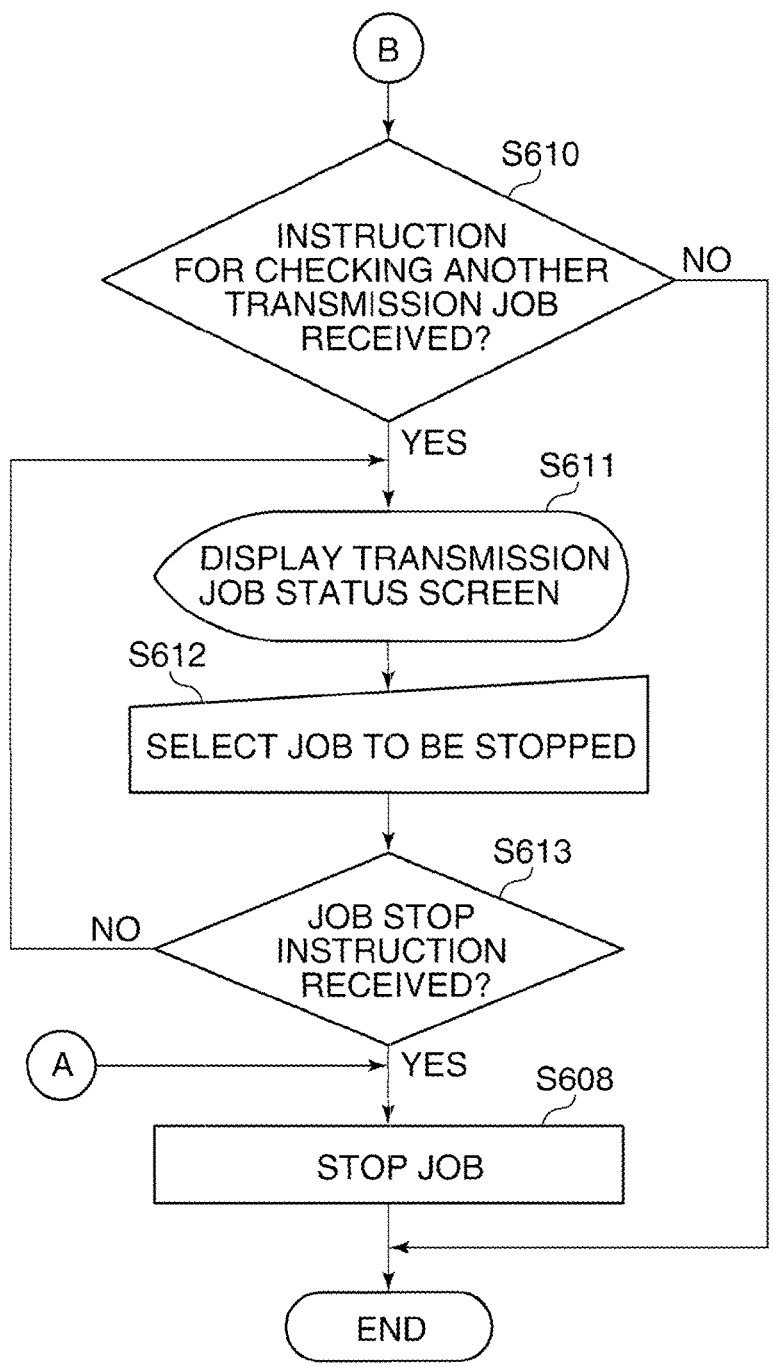
FIG. 6B is a continuation of FIG. 6A.

If it is determined that the stop button 504 has been pressed, the system controller 108 proceeds to a step S608 in FIG. 6B, wherein the system controller 108 (stopping unit) stops the transmission job held in the HDD 110, followed by terminating the present process.

On the other hand, if it is determined in the step S607 that not the stop button 504, but the close button 505 has been pressed, the system controller 108 closes the stop confirmation screen 501, followed by terminating the present process.

In the step S606, the system controller 108 displays the stop confirmation screen 506 showing the transmission destination name and the transmission destination, which are held in the step S603 as the search result, in the transmission destination name display area 507 and the transmission destination display area 508, respectively, on the LCD 201. Then, the system controller 108 proceeds to a step S609.

In the step S609, the system controller 108 determines whether or not an instruction for stopping the transmission job held in the HDD 110 has been received. More specifically, the system controller 108 determines whether or not the stop button 510 on the stop confirmation screen 506 has been pressed.

If it is determined that the stop button 510 has been pressed, the system controller 108 proceeds to the step S608, and stops the transmission job held in the HDD 110, followed by terminating the present process.

On the other hand, if it is determined in the step S609 that not the stop button 510, but a button other than the stop button 510 has been pressed, the system controller 108 proceeds to a step S610.

Next, as shown in FIG. 6B, in the step S610, the system controller 108 determines whether or not an instruction for checking another transmission job has been received. More specifically, the system controller 108 determines whether or not the "stop another job" button 509 has been pressed.

If it is determined that the "stop another job" button 509 has been pressed, the system controller 108 proceeds to a step S611. If it is determined that a button other than the "stop another job" button 509, i.e. the close button 511 has been pressed, the system controller 108 terminates the present process.

In the step S611, the system controller 108 displays the transmission job status screen 512 on the LCD 201. If the user presses the close button 515 on the transmission job status screen 512 in this state, the system controller 108 stops displaying the transmission job status screen 512, and displays the transmission configuration screen shown in FIG. 3A. In the following, processing for selecting and stopping a transmission job (steps S612, S613, and S608) will be described.

In the step S612, the user selects a transmission job desired to be stopped out of the plurality of transmission jobs displayed on the transmission job list 513, and the system controller 108 proceeds to the step S613. The selected transmission job is highlighted as the job to be stopped. If the highlighted transmission job is selected again in this state, the transmission job is excluded from the target to be stopped and the highlight display is cancelled.

In the step S613, the system controller 108 determines whether or not an instruction for stopping the transmission job has been received. More specifically, the system controller 108 determines whether or not the stop button 514 on the transmission job status screen 512 has been pressed. If it is determined that the stop button 514 has been pressed, the stop confirmation screen 501 showing the transmission destination name and the transmission destination of the transmission job to be stopped in the transmission destination name display area 502 and the transmission destination display area 503, respectively, is displayed. If it is detected that the stop button 504 on the displayed stop confirmation screen 501 has been pressed, the system controller 108 proceeds to the step S608, and stops the transmission job held in the HDD 110, followed by terminating the present process. On the other hand, if it is detected that the close button 505 on the displayed stop confirmation screen 501 has been pressed, the system controller 108 returns to the step S611.

Referring again to FIG. 6A, in the step S615, the system controller 108 displays a print job list screen (not shown) on the LCD 201, and proceeds to a step S616. Here, the print job list screen is comprised of a print job list on which the latest print status of each print job held in the HDD 110 is displayed, a stop button, and a close button, and is displayed on the LCD 201 of the console section 103.

In the step S616, the user selects a print job desired to be stopped out of the print jobs displayed on the print job list screen, and the system controller 108 proceeds to a step S617.

In the step S617, the system controller 108 displays a stop confirmation screen (not shown) for prompting the user to confirm whether or not to stop the selected print job. The stop confirmation screen displayed in the step S617 is comprised of a file name of the selected print job, a stop button, and a close button, and is displayed on the LCD 201 of the console section 103.

In a step S618, the system controller 108 determines whether or not an instruction for stopping the selected print job has been received, more specifically, whether or not the stop button on the stop confirmation screen displayed in the step S617 has been pressed. If it is determined that the stop button has been pressed, the system controller 108 proceeds to the step S608, and stops the selected print job held in the HDD 110, followed by terminating the present process. On the other hand, if it is determined that not the stop button, but the close button on the stop confirmation screen has been pressed, the system controller 108 returns to the step S615.

As described above, even in a case where there are a plurality of transmission jobs, it is possible to positively stop a transmission job desired by the user according to the number of transmission jobs held in the HDD 110, by reducing the number of steps required to go through to stop a transmission job.

Note that although in the present embodiment, the stop confirmation screens 501 and 506 are displayed, the present invention is not limited to this. For example, in a case where the stop key 204 is pressed during display of the transmission configuration screen, a transmission job input last may be stopped without displaying the stop confirmation screen 501 or 506. In this case, a late notice screen showing the transmission destination and the transmission destination name of the stopped transmission job may be displayed after the stop processing. Further, the user may be enabled to set in advance whether or not to display the stop confirmation screen 501 or 506 in a case where the stop key 204 is pressed during display of the transmission configuration screen.

Further, although in the present embodiment, insofar as a print job is concerned, the print job list is displayed in the step S615 regardless of whether or not the number of uncompleted print jobs is one, the same processing as that for a transmission job may be performed. That is, in a case where the number of uncompleted print jobs is one, a stop confirmation screen for prompting the user to confirm whether or not to stop the print job may be displayed. Further, in a case where the number of uncompleted print jobs is more than one, a stop confirmation screen for prompting the user to confirm whether or not to stop a print job input last may be displayed.

Further, although in the present embodiment, the stop key 204 is the hard key provided on the console section 103, this is not limitative. For example, in a case where the user performs processing for transmitting a transmission job or a print job from a PC to the job processing apparatus 100, a stop icon may be displayed on the screen of the PC. Further, in a case where the user selects the stop icon, the step S602 et seq. may be executed, and one of the stop confirmation screens displayed in the steps S605, S606, and S617 may be displayed on the screen of the PC.

Next, a description will be given of the transmission job-stopping process performed when the stop key 204 is pressed by the user in a case where user authentication has been performed, with reference to FIGS. 7A and 7B. The present process is performed by the system controller 108 that loads a program for executing the present process, which is stored in the ROM of the system memory 106, into the RAM, not shown.

Figure 7A:
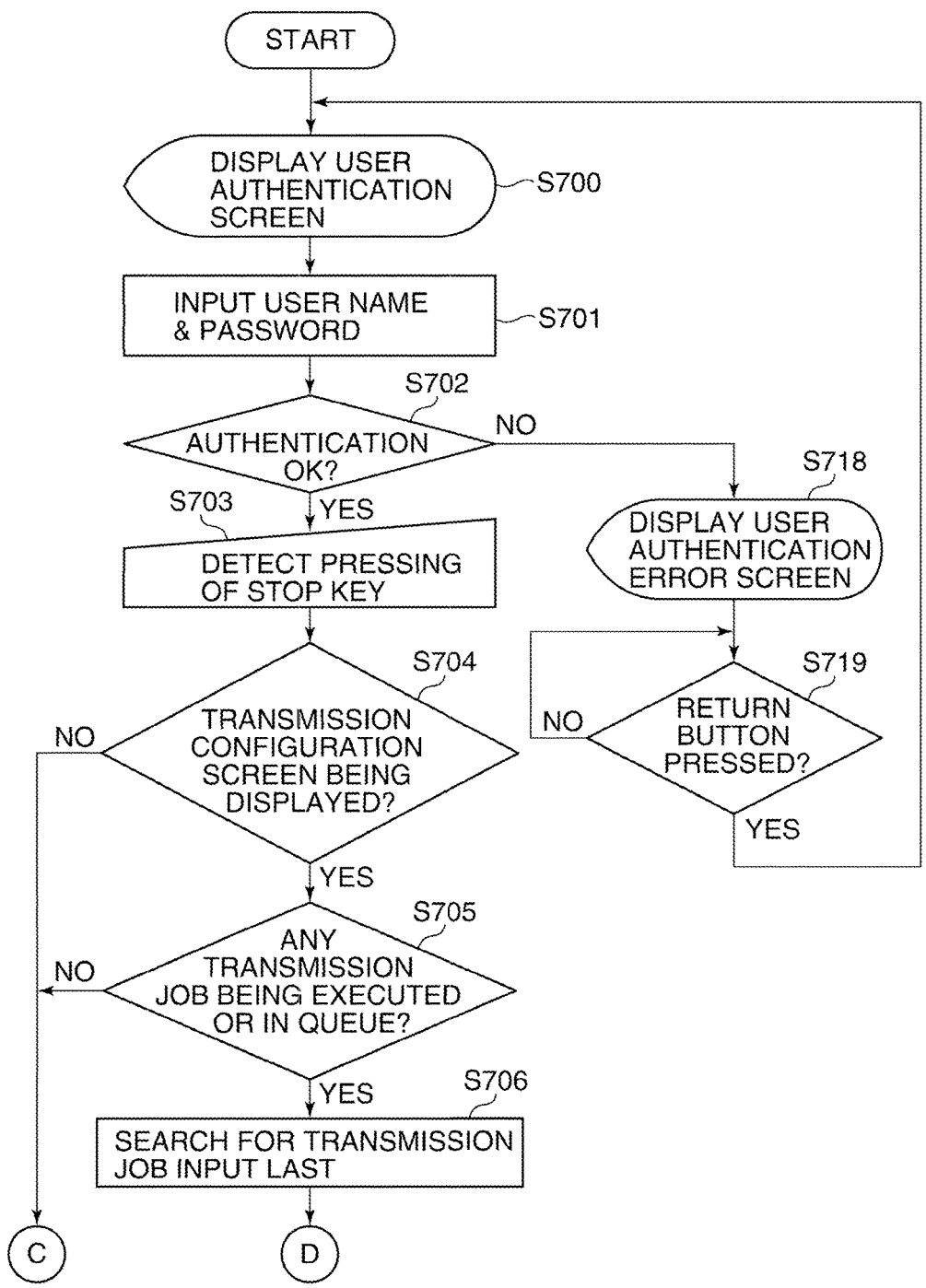
FIG. 7A is a flowchart of a transmission job-stopping process performed when the stop key is pressed by the user in a case where user authentication has been performed.
Figure 7B:
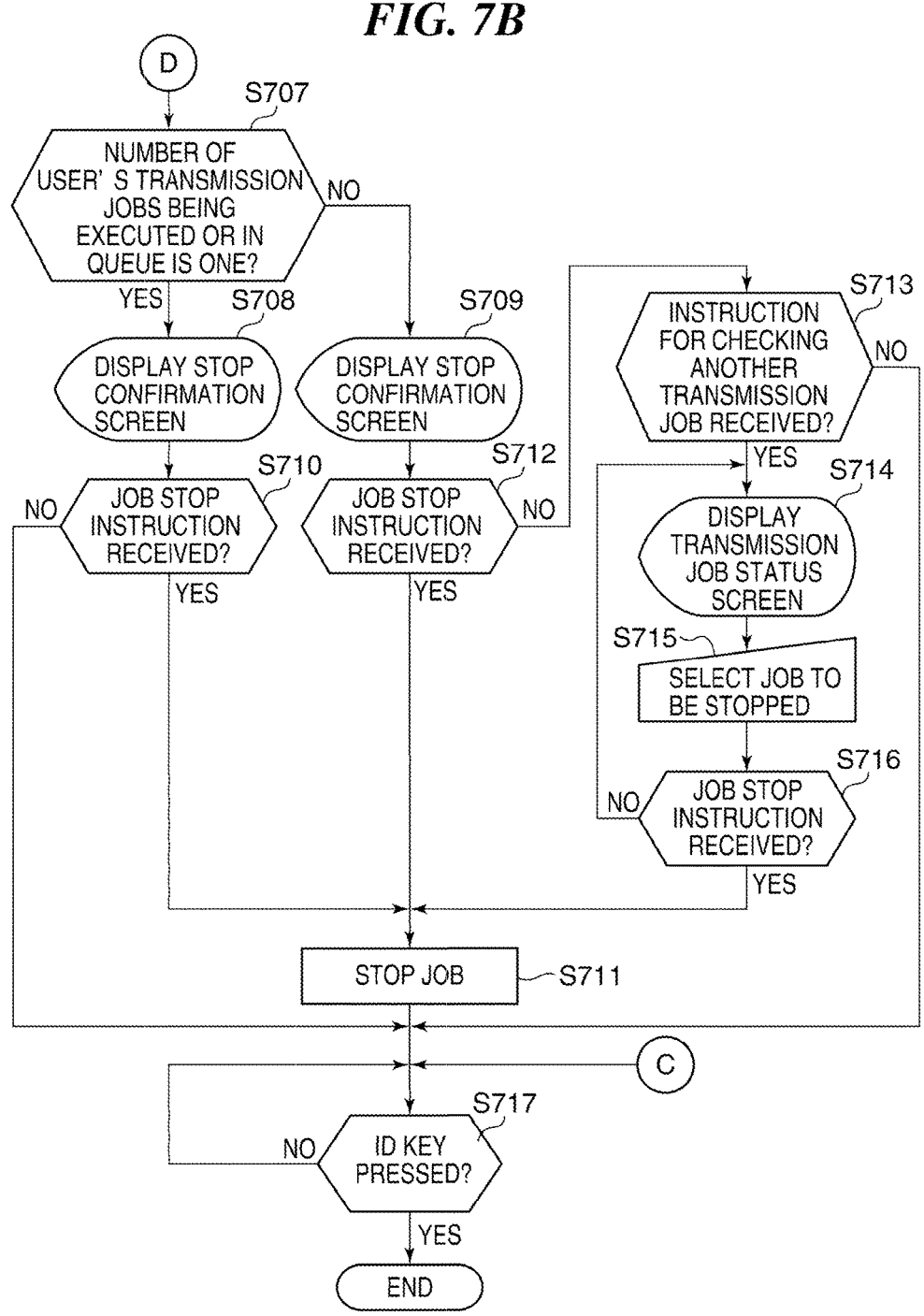
FIG. 7B is a continuation of FIG. 7A.

Referring to FIG. 7A, first, in a step S700, the console section 103 displays the user authentication screen (see FIG. 3B).

In a step S701, the user inputs his/her registered name and a password in the user name input box 308 and the password input box 309 on the user authentication screen displayed in the step S700, respectively. In the illustrated example, a case where "Sato Taro" is input as the user name will be described. The input user name and password are stored in the HDD 110 by the system controller 108.

In a step S702, the system controller 108 compares the user name and password stored in the HDD 110, with the user name and password stored in the user database 313 (see FIG. 3D), and determines whether or not user authentication is successful.

As a result of the comparison, if the user is a user whose name and password input in the step S701 have not been registered in the user database 313, it is determined that user authentication is unsuccessful, and the system controller 108 proceeds to a step S718. On the other hand, as a result of the comparison, if the user is a user whose name and password have been registered in the user database 313, it is determined that user authentication is successful, and the system controller 108 proceeds to a step S703.

In the step S703, in a case where it is detected that the stop key 204 has been pressed, the system controller 108 proceeds to a step S704.

In the step S704, the system controller 108 determines whether or not the transmission configuration screen is being displayed on the LCD 201 of the console section 103, and if the transmission configuration screen is being displayed, the system controller 108 proceeds to a step S705. On the other hand, if the transmission configuration screen is not being displayed (for example, if the menu screen is being displayed), the system controller 108 proceeds to a step S717 in FIG. 7B.

In the step S705, the system controller 108 determines, based on the job management table (see e.g. FIG. 4A or 4B), whether or not there is a transmission job held in the HDD 110, i.e. whether or not there is a transmission job being executed or being in queue. If it is determined that there is a transmission job being executed or being in queue, the system controller 108 proceeds to a step S706, whereas if not, the system controller 108 proceeds to the step S717.

In the step S706, the system controller 108 searches the job management table (see e.g. FIG. 4A or 4B) for a transmission job which was input last, i.e. which is the latest in the job reception time 402 out of the transmission jobs each having the job owner name "Sato Taro". After that, the system controller 108 holds the transmission destination name and the transmission destination of the transmission job retrieved by search as a search result, and proceeds to a step S707 in FIG. 7B.

Next, in the step S707, the system controller 108 determines, based on the job management table, whether the number of the user's transmission jobs, i.e. the number of transmission jobs having the job owner name "Sato Taro", held in the HDD 110, is one or more than one.

If it is determined that the number of the user's transmission jobs is one, the system controller 108 proceeds to a step S708, whereas if it is determined that the number of the user's transmission jobs is more than one, the system controller 108 proceeds to a step S709.

In the step S708, the system controller 108 displays the stop confirmation screen 501 showing the transmission destination name and the transmission destination, which are held in the step S706 as the search result, in the transmission destination name display area 502 and the transmission destination display area 503, respectively, on the LCD 201. Then, the system controller 108 proceeds to a step S710.

In the step S710, the system controller 108 determines whether or not an instruction for stopping the transmission job held in the HDD 110 has been received. More specifically, the system controller 108 determines whether or not the stop button 504 on the stop confirmation screen 501 has been pressed.

If it is determined that the stop button 504 has been pressed, the system controller 108 proceeds to a step S711, wherein the system controller 108 stops the transmission job held in the HDD 110, and proceeds to the step S717.

On the other hand, if it is determined in the step S710 that not the stop button 504, but the close button 505 has been pressed, the system controller 108 closes the stop confirmation screen 501, and proceeds to the step S717.

In the step S709, the system controller 108 displays the stop confirmation screen 506 showing the transmission destination name and the transmission destination, which are held in the step S706 as the search result, in the transmission destination name display area 507 and the transmission destination display area 508, respectively, on the LCD 201. Then, the system controller 108 proceeds to a step S712.

In the step S712, the system controller 108 determines whether or not an instruction for stopping the transmission job has been received. More specifically, the system controller 108 determines whether or not the stop button 510 on the stop confirmation screen 506 has been pressed.

If it is determined that the stop button 510 has been pressed, the system controller 108 proceeds to the step S711, wherein the system controller 108 stops the transmission job held in the HDD 110, and proceeds to the step S17.

On the other hand, if it is determined in the step S12 that not the stop button 510, but a button other than the stop button 510 has been pressed, the system controller 108 proceeds to a step S713.

In the step S713, the system controller 108 determines whether or not an instruction for checking another transmission job has been received. More specifically, the system controller 108 determines whether or not the "stop another job" button 509 has been pressed.

If it is determined that the "stop another job" button 509 has been pressed, the system controller 108 proceeds to a step S714. On the other hand, if it is determined that a button other than the "stop another job" button 509, i.e. the close button 511 has been pressed, the system controller 108 proceeds to the step S717.

In the step S714, the system controller 108 displays the transmission job status screen 512 on the LCD 201. At this time, the transmission job displayed on the transmission job list 513 is only jobs having the job owner name "Sato Taro" in the job management table. That is, in a case where the transmission job status screen 512 is displayed based on the job management table shown in FIG. 4B after user authentication, only the job statuses of the job IDs "0001" and "0002" are displayed. If the user presses the close button 515 on the transmission job status screen 512 in this state, the system controller 108 stops displaying the transmission job status screen 512, and displays the transmission configuration screen shown in FIG. 3A. In the following description, processing for selecting and stopping a transmission job (steps S715, S716, and S711) will be described.

In the step S715, the user selects a transmission job desired to be stopped out of the plurality of transmission jobs displayed on the transmission job list 513, and the system controller 108 proceeds to the step S716. The selected transmission job is highlighted as a job to be stopped. If the highlighted transmission job is selected again in this state, the transmission job is excluded from the target to be stopped, and the highlight display is cancelled.

In the step S716, the system controller 108 determines whether or not an instruction for stopping the transmission job has been received. More specifically, the system controller 108 determines whether or not the stop button 514 on the transmission job status screen 512 has been pressed. If it is determined that the stop button 514 has been pressed, the system controller 108 displays the stop confirmation screen 501 showing the transmission destination name and the transmission destination of the transmission job to be stopped in the transmission destination name display area 502 and the transmission destination display area 503, respectively. If the stop button 504 is pressed in this state, the system controller 108 proceeds to the step S711, wherein the system controller 108 stops the transmission job held in the HDD 110, and proceeds to the step S717. On the other hand, if it is detected that the close button 505 has been pressed, the system controller 108 returns to the step S714.

In the step S717, the system controller 108 determines whether or not the ID key 206 has been pressed. If the ID key 206 has been pressed, the system controller 108 causes "Sato Taro" who is the currently logged-in user having the user ID "0001" to log out, followed by terminating the present process.

Referring again to FIG. 7A, in the step S718, the system controller 108 displays the user authentication error screen, and in the following step S719, it is determined whether or not the return" button 312 has been pressed. The system controller 108 waits until the return button 312 is pressed, and when it is determined that the return button 312 is pressed, returns to the step S700 to display the user authentication screen described with reference to FIG. 3B again.

In the above-described embodiment, the system controller 108 searches the job management table (see e.g. FIG. 4A or 4B) for a transmission job input last, by setting a search range to all transmission jobs being executed (being transmitted) and being in queue, in the steps S603 and S706. However, the search range may be configured as follows. For example, The search range may be set to all jobs being executed (being transmitted). By changing the search range as above, even in a case where there are a plurality of transmission jobs being executed (being transmitted) and being in queue, it is possible to provide an instruction for stopping a transmission job being executed without displaying the list of transmission jobs.

Further, the search may be configured as follows. For example, the search range is set to all transmission jobs being executed (being transmitted) and being in queue, similarly to the steps S603 and S706, and a transmission job input first may be searched for from the search range.

Further, in another embodiment, whether the search range is set to all transmission jobs being executed and being in queue, or only to transmission jobs being executed may be configured by a user's instruction (or an administrator's instruction). Further, whether a retrieval target to be searched for is set to a transmission job input last or a transmission job input first may be configured by a user's instruction (or an administrator's instruction) without changing the search range.

Other Embodiments

Although the embodiments have been described in detail, the present invention can be configured e.g. as a system, an apparatus, a method, a program, a storage medium (recording medium), or the like. More specifically, the present invention can be applied to a system comprised of a plurality of devices, or can be applied to an apparatus comprised of one device.

Embodiment(s) of the present invention can also be realized by a computer of a system or apparatus that reads out and executes computer executable instructions (e.g., one or more programs) recorded on a storaue medium (which may also be referred to more fully as a non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention may be realized by any other form, such as an object code, a program executed by an interpreter, and script data supplied to an OS, insofar as it has a program function.

Further, as a method of supplying the program, the program can be supplied by downloading from a website on the Internet to a recording medium, such as a hard disk, using a browser of a client computer. That is, for example, by connecting to the website, the computer program itself of the present invention or a compressed file including an automatic installation function is downloaded from the website. Further, it is also possible to realize the present invention, by dividing the program code forming the program of the present invention into a plurality of files, and downloading the program files from respective different websites. That is, a WWW server that allows a plurality of users to download the program files for realizing the processing function of the present invention on a computer is also included in the present invention.

Further, the program of the present invention is encrypted and stored in a storage medium, such as a CD-ROM, and is distributed to a user. Then, a user who satisfied a predetermined condition is allowed to download key information for decoding the program, from the website, via the Internet. Then the present invention can be realized by executing the encrypted program using the key information to thereby install the program.

Further, the functions of the above-described embodiments can also be realized after the program read from the recording medium is written into a memory provided in a function extension board inserted in the computer or a function extension unit connected to the computer. That is, the functions of the above-described embodiments can be realized by a CPU or the like provided in the function extension board or the function extension unit, which performs part or all of actual processing based on instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-202697 filed Oct. 19, 2017, which is hereby incorporated by reference herein in its entirety.

What is claimed is:

1. A job processing apparatus comprising,
at least one memory storing instructions, and
at least one processor executing the instructions causing the job processing apparatus to:
manage one or more transmission jobs which are uncompleted out of transmission jobs;
receive a first stop instruction for a transmission job according to a user's operation;
search for a transmission job input last out of the managed one or more transmission jobs in a case where the first stop instruction is received;
display a confirmation screen for receiving a second stop instruction for stopping the searched-for last input transmission job in a case where the first stop instruction is received; and
stop the last input transmission job when the second stop instruction is received via the confirmation screen,
wherein, in a case where a plurality of transmission jobs have been managed when the first stop instruction is received, the confirmation screen includes both a first button for the second stop instruction and a second button for displaying a job list screen for receiving selection of a transmission job to be stopped out of the managed transmission jobs, and wherein, in a case where one transmission job has been managed when the first stop instruction is received, the confirmation screen includes the first button and does not include the second button.

2. The job processing apparatus according to claim 1, wherein the confirmation screen displays information on the searched-for last input transmission job.

3. The job processing apparatus according to claim 2, wherein the information on the searched-for last input transmission job is a transmission destination and a transmission destination name of the searched-for last input transmission job.

4. The job processing apparatus according to claim 1, wherein the instructions further cause the job processing apparatus to:

perform user authentication using information including a user name, wherein in a case where a transmission job is input, in a state in which the user authentication has been performed, the input transmission job is managed with the user name as a job owner name of the input transmission job, and extract, in a case where the first stop instruction is received in the state in which the user authentication has been performed, one or more transmission jobs whose job owner name is the user name from the managed transmission jobs, and wherein the searching for a transmission job input last is performed out of the extracted transmission jobs.

5. A method of controlling a job processing apparatus, comprising:

managing one or more uncompleted transmission jobs out of transmission jobs;

receiving a first stop instruction for a transmission job according to a user's operation;

searching for a transmission job input last out of the one or more managed transmission jobs, in a case where the first stop instruction is received; and displaying a confirmation screen for receiving a second stop instruction for stopping the searched-for last input transmission job in a case where the first stop instruction is received;

stopping the searched-for last input transmission job when the second stop instruction is received via the confirmation screen, wherein, in a case where a plurality of transmission jobs have been managed when the first stop instruction is received, the confirmation screen includes both a first button for the second stop instruction and a second button for displaying a job list screen for receiving selection of a transmission job to be stopped out of the managed transmission jobs, and wherein, in a case where one transmission job has been managed when the first stop instruction is received, the confirmation screen includes the first button and does not include the second button.

6. A non-transitory computer-readable storage medium storing a computer-executable program for executing a method of controlling a job processing apparatus, wherein the method comprises:

managing one or more uncompleted transmission jobs out of transmission jobs;

receiving a first stop instruction for a transmission job according to a user's operation;

searching for a transmission job input last out of the one or more managed transmission jobs, in a case where the first stop instruction is received; and displaying a confirmation screen for receiving a second stop instruction for stopping the searched-for last input transmission job in a case where the first stop instruction is received;

stopping the searched-for last input transmission job when the second stop instruction is received via the confirmation screen, wherein, in a case where a plurality of transmission jobs have been managed when the first stop instruction is received, the confirmation screen includes both a first button for the second stop instruction and a second button for displaying a job list screen for receiving selection of a transmission job to be stopped out of the managed transmission jobs, and wherein, in a case where one transmission job has been managed when the first stop instruction is received, the confirmation screen includes the first button and does not include the second button.

* * * * *